United States Patent [19]
Matté et al.

[11] Patent Number: 5,483,803
[45] Date of Patent: Jan. 16, 1996

[54] HIGH CONDUCTANCE WATER PUMP

[75] Inventors: Stephen R. Matté, Norfolk; Alan L. Weeks, South Easton; Philip A. Lessard, Boxborough, all of Mass.

[73] Assignee: Helix Technology Corporation, Mansfield, Mass.

[21] Appl. No.: 331,170

[22] Filed: Oct. 28, 1994

Related U.S. Application Data

[63] Continuation-in-part of Ser. No. 78,990, Jun. 16, 1993, abandoned.

[51] Int. Cl.⁶ ..................................................... B01D 8/00
[52] U.S. Cl. ............................... 62/55.5; 415/90; 417/901
[58] Field of Search ........................... 62/55.5; 417/901; 415/90

[56] References Cited

U.S. PATENT DOCUMENTS

| | | | |
|---|---|---|---|
| 2,465,793 | 3/1946 | DeGroat | 62/1 |
| 3,536,418 | 10/1970 | Breaux | 62/55.5 |
| 3,625,019 | 12/1971 | Osterstrom | 62/55.5 |
| 3,648,473 | 3/1972 | Stephenson | 62/55.5 |
| 3,788,096 | 1/1974 | Brilloit | 62/55.5 |
| 3,854,298 | 12/1974 | Carter | 62/55.5 |
| 3,859,807 | 1/1975 | Benedict et al. | 62/55.5 |
| 4,277,951 | 7/1981 | Longsworth | 62/55.5 |
| 4,449,373 | 5/1984 | Peterson et al. | 62/55.5 |
| 4,506,513 | 3/1985 | Max | 62/55.5 |
| 4,538,423 | 9/1985 | Le Diouron | 62/55.5 |
| 4,555,912 | 12/1985 | Bogosh | 62/55.5 |
| 4,679,402 | 7/1987 | Andeen | 62/55.5 |
| 4,755,201 | 7/1988 | Eschwey et al. | 62/55.5 |
| 4,791,791 | 12/1988 | Flegal et al. | 62/55.5 |
| 4,873,833 | 10/1989 | Pfeiffer | 62/55.5 |
| 4,926,648 | 5/1990 | Okumura et al. | 62/55.5 |
| 5,062,271 | 11/1991 | Okumura et al. | 62/55.5 |
| 5,261,244 | 11/1993 | Lessard et al. | 62/55.5 |

FOREIGN PATENT DOCUMENTS

| | | |
|---|---|---|
| 0332107 | 6/1989 | European Pat. Off. |
| 0397051 | 4/1990 | European Pat. Off. |
| 0610666 | 11/1994 | European Pat. Off. |
| 59-90784 | 11/1982 | Japan |
| 60-212975 | 9/1985 | Japan |
| 62-168994 | 7/1987 | Japan |

OTHER PUBLICATIONS deRijke, Johan E. & Klages, William A., "The cryoturbo: A new concept in vacuum technology," *Solid State Technology*, Apr. 1994, pp. 63–65.

Roth, A., "Vacuum Technology," pp. 87, 105 (1982).

Stegel, R., and Howell, J. R., "Thermal Radiation Heat Transfer," p. 787 (1972).

Carette, J. D., et al., "New Developments in the Calculation of the Molecular Flow Conductance of a Straight Cylinder," *J. Vac. Sci. Technol.* A 1(2), pp. 143–146, (1983, Apr.–Jun.).

*Primary Examiner*—Ronald C. Capossela
*Attorney, Agent, or Firm*—Hamilton, Brook, Smith & Reynolds

[57] ABSTRACT

A cryogenically cooled water pump traps water vapor with a high probability but is open to non-condensing gases for high conductance to a turbomolecular pump. The preferred array is a single cylinder, having a length to diameter ratio of between 0.5 and 1, concentric with and near to an ambient temperature conduit. A center baffle, preferably of closed frustoconical shape, may be positioned at the center of the array over the upper bearing plate of the turbomolecular pump where it results in minimal reduction in conductance to the pump.

40 Claims, 8 Drawing Sheets

HIGH CONDUCTANCE WATER PUMP

RELATED APPLICATION

This application is a continuation-in-part of co-pending application Ser. No. 08/078,990 filed on Jun. 16, 1993, now abandoned which is incorporated herein by reference in its entirety.

BACKGROUND

In many applications, cryogenically cooled baffles are positioned within a fluid conduit to trap gases, particularly water vapor, and thus remove the gases from the flowing fluid. For example, although diffusion pumps and turbomolecular pumps are very efficient at removing many gases from the environment to create a vacuum, they are not efficient in pumping water vapor. Therefore, it is common practice to position a cold trap in-line ahead of the diffusion or turbomolecular pump to remove the water vapor as the remainder of the gases in the fluid are drawn by the pump.

SUMMARY OF THE INVENTION

In an effort to increase the capture rate of water vapor, prior cold traps have positioned cryopumping surfaces across the fluid conduit. However, such surfaces reduce the conductance of the cold trap for other non-condensable gases which must be drawn out by the downstream vacuum pump. In accordance with the present invention, it has been determined that a high capture rate for water vapor can be retained while substantially increasing the conductance of the cold trap by opening the passage through the cold trap. In particular, a cryogenically cooled array within a fluid conduit should have a length to hydraulic diameter ratio of about 1 or less and should otherwise be substantially open to gases moving toward the downstream pump. Hydraulic diameter is equal to 4 times the cross-sectional area of the fluid passage through the array divided by the perimeter length of the array. For a cylinder, the hydraulic diameter is its actual diameter.

In the preferred embodiment, the cryopumping array is a simple cylindrical array concentric with and near to the fluid conduit walls. To maximize conductance of non-condensing gases such as nitrogen and argon, the length to diameter ratio of the cylindrical array should be about 1 or less. On the other hand, for a high capture rate of water vapor, the length to diameter ratio of the cylindrical array should be at least 0.5.

A center baffle may be provided within the cylindrical array at a downstream end thereof. The baffle should leave the array substantially optically open from the inlet to the array to the downstream pump port. A preferred baffle is conical in shape with its base adjacent to the downstream end of the cylindrical cryopumping array.

Using the open structural configuration of the present invention with array temperature in the range of 90 K to 130 K, a cold trap is able to capture water vapor entering the conduit in molecular flow with a probability of at least 0.8 yet is able to conduct nitrogen through the conduit to a turbomolecular or other vacuum pump with a probability of at least 0.5.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
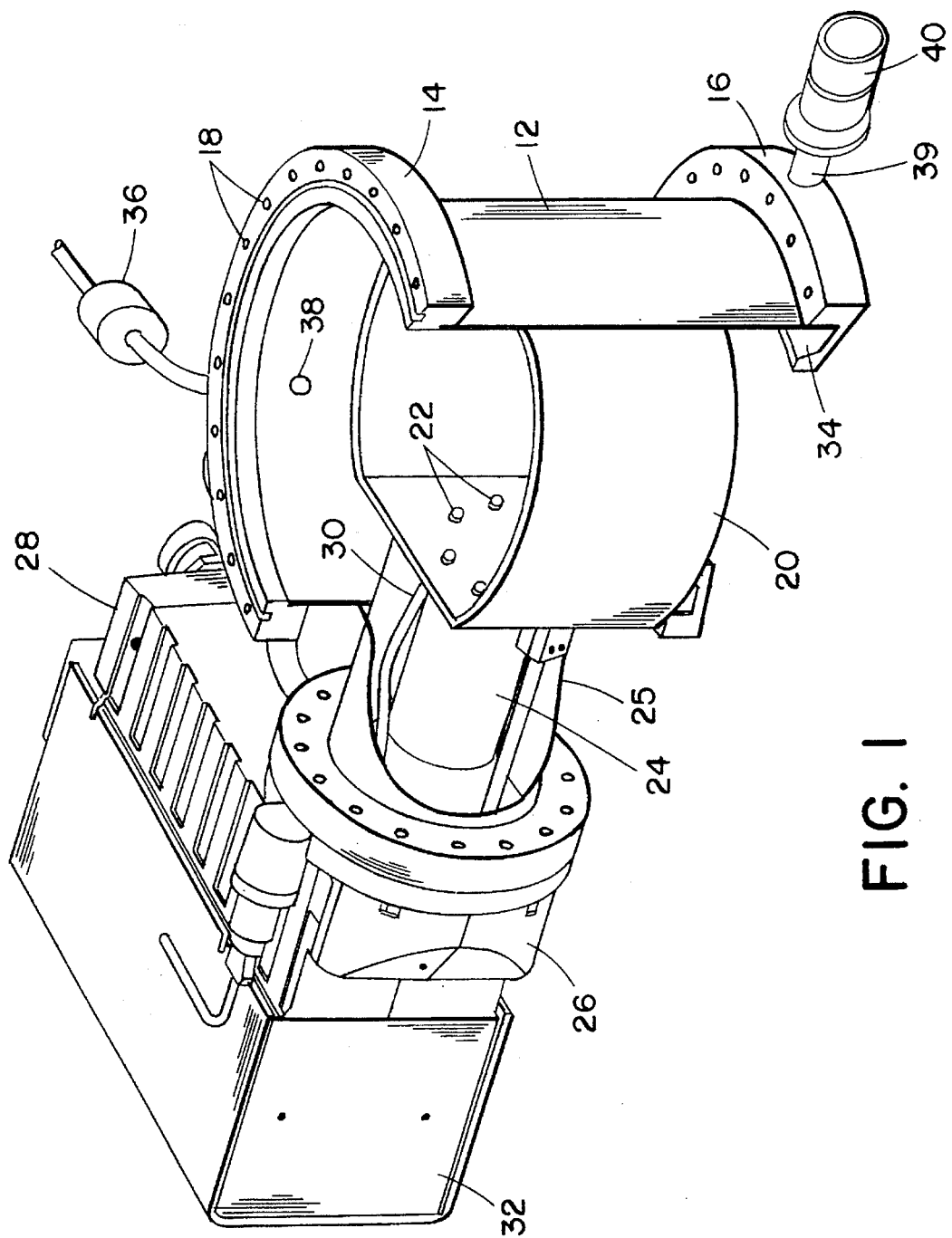
FIG. 1 is a perspective view of a cold trap embodying the present invention broken away to expose the refrigerator cold finger and cooled cryopumping array.
Figure 2:
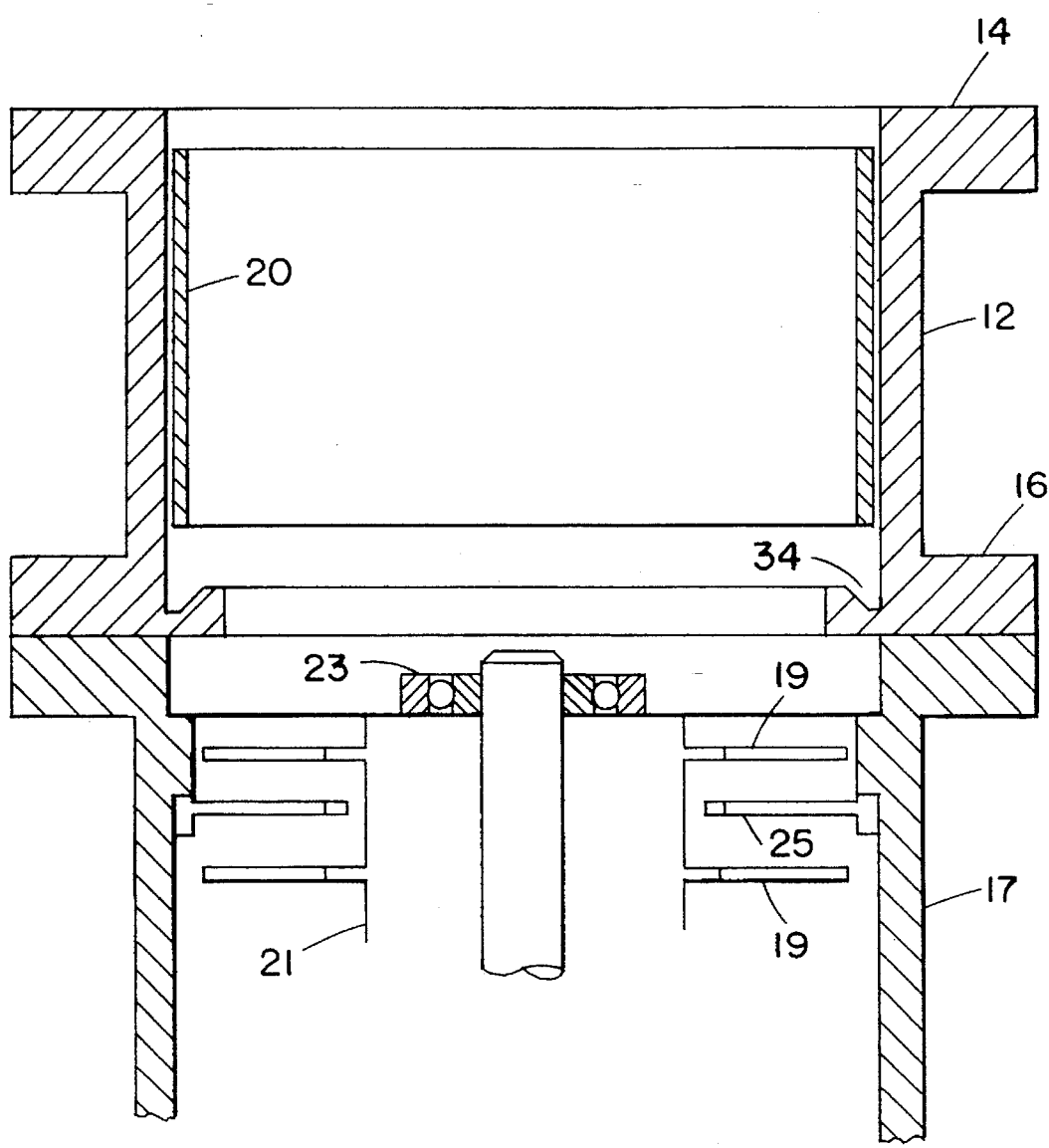
FIG. 2 is a cross-sectional view of the array within the fluid conduit of FIG. 1 mounted to a turbomolecular pump.

As illustrated in FIGS. 1 and 2, a waterpump of the present invention includes a cylindrical fluid conduit 12 having connecting flanges 14 and 16 at opposite ends thereof. Each flange has bolt holes 18 for mounting. For example, the flange 14 might couple the waterpump to a port in a process chamber and the flange 16 might couple the cold trap to a turbomolecular pump.

A typical turbomolecular pump 17 is illustrated in FIG. 2. A plurality of rotor blades 19 are displaced axially along a rotor 21 which may be supported at its upper end by a bearing plate 23. The stator of the turbomolecular pump has a plurality of blades 25 between the rotor blades. Gases which reach the rotor blades through molecular flow are driven out of the vacuum system by the blades.

Suspended within the fluid conduit 12 is a cylindrical cryopumping array 20 having a flat portion mounted with bolts 22 to a heat station at the end of a single stage cryogenic refrigerator 24. The array 20 is suspended to avoid contact with the conduit 12 and thus avoid a thermal short from the refrigerator to the conduit which is at ambient temperature. The cold finger is within a side vessel 25 which is at ambient temperature. The preferred material of the array is 0.05 to 0.15 inch thick copper. One implementation has a length of about 6 inches and a diameter of about 8 inches for a length to diameter ratio of 0.75.

The preferred cryogenic refrigerator is a conventional single stage Gifford-MacMahon refrigerator. Within the cold finger 24 is a displacer which is driven through a scotch-yoke assembly 26 by a motor 28. Preferably, the refrigerator is provided with a temperature sensor for sensing the temperature of the heat sink and a heater 30 for controlling the temperature of the heat sink. Temperatures of the heat sink during pumping operation and during the regeneration process are controlled by electronics within a housing 32 as described in U.S. Pat. No. 4,918,930 to Gaudet et al. For pumping water, the array should be in the range of 90 K to 130 K, preferably about 110 K.

The array 20, which will be discussed in detail below, captures water vapor yet does not provide substantial flow resistance to non-condensing gases such as nitrogen and argon. After a period of time, the frost of the captured water collects to such an extent that the waterpump must be regenerated. The regeneration process may be initiated by a user or may be under a programmed timing sequence initiated by the electronics 32. In a preferred method, the operation of the refrigerator is discontinued to permit the array to warm. Preferably, for rapid regeneration the array is heated through the heat station by the heater 30. The array is positioned to direct all resultant liquid water to a collection trough 34 at the lower end of the fluid conduit. For ease of manufacturing, the trough may be formed in the upper surface of the flange 16 as illustrated. The trough 34 is coupled through a drain pipe 39 to a pressure relief valve 40. A preferred pressure relief valve 40 is presented in U.S. Pat. Ser. No. 5,137,050 to Clarke et al. and assigned to the assignee of the present invention.

Once the array has been heated to 310 K, and preferably after a wait to assure that all frost has melted, a nitrogen purge gas is introduced through a valve 36 and port 38 into the fluid conduit 12. Once the pressure within the fluid conduit 12 reaches a level of about 1 PSI gauge, the relief valve 40 opens and the liquid in the trough 34 is blown through the drain port 39. Preferably, the purge is maintained as the array is heated by the heater to dry the array and trough. The heater is turned off and the refrigerator is again turned on to cool the array for continued operation.

An alternative method of regeneration would be to continue operation of the turbomolecular pump and to warm the array only to a level which causes release of gases through sublimation, for this design, items 34, 36, 38, 39 and 40 would not be required.

Prior waterpumps have cryopumping surfaces spaced across the conduit in order to capture a high percentage of water vapor flowing through the conduit while permitting other non-condensing gases to continue on to the turbomolecular or other vacuum pump. It has been determined that water vapor can be captured by the simple cylindrical array 20 with a high degree of efficiency while substantially increasing the throughput of non-condensing gases to the turbomolecular pump.

At the low pressure of $10^{-3}$ torr or less at which the system operates, any gas flow to the turbomolecular pump is in molecular flow. That is, molecules move in straight paths until they reach a surface at which they either condense, and thus stick, or are re-emitted. Any water vapor which strikes the cylindrical array 20 sticks to the array. Statistically, the direction of re-emitted molecules is independent of angle of incidence. Rather, re-emitted molecules are distributed according to a cosine function; that is, the molecules are most likely to travel in a direction perpendicular to the surface. A non-condensing molecule which enters the inlet to the cylindrical array and which strikes the array is as likely to be re-emitted back toward the inlet as toward the outlet of the array.

For efficient water pumping, the array must be designed such that all water molecules have a high probability of striking the cooled array once. On the other hand, for maximum conductance of non-condensing gases, additional strikes of the array by re-emitted molecules should be minimized. Therefore, the cylinder 20 must be sufficiently long relative to its diameter to assure that a high percentage of the water molecules strike the cylindrical array rather than passing directly through to the turbomolecular pump. On the other hand, increased length of the array results in non-condensing gases striking the array multiple times before reaching the turbomolecular pump and thus reduces the conductance for those gases.

Figure 3:
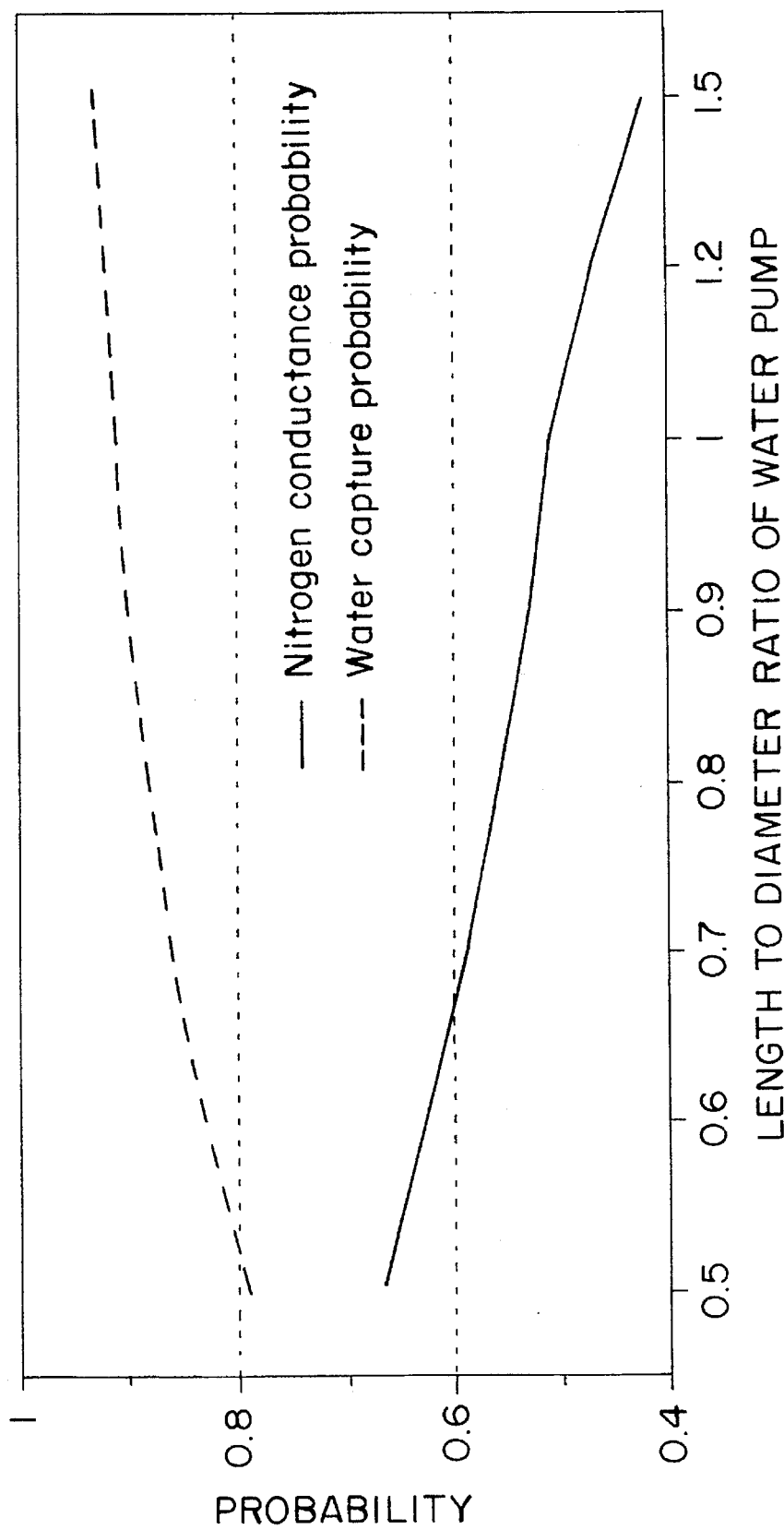
FIG. 3 is a graphical illustration of the relationship of water pumping speed and nitrogen conductance relative to length to diameter ratio of the cylindrical array of FIGS. 1 and 2.

FIG. 3 illustrates the efficiency of water pumping and the conductance of non-condensing gases relative to the length to diameter ratio of the water pump cylindrical array 20. The broken line represents the probability that a water molecule will strike the array and thus be captured. The solid line indicates the probability that a nitrogen molecule entering the inlet of the array will pass through to the outlet rather than being reflected back through the inlet. It can be seen that to pump near 80 percent of the water vapor, the cylindrical array should have a length to diameter ratio of at least 0.5. At that ratio, the conductance of nitrogen is somewhat less than 70 percent. By increasing the length for a given diameter, the water capture rate steadily increases to about 90 percent with a ratio of about 1, but the conductance for nitrogen steadily decreases to near 50 percent at a ratio of about 1. Thus, to maintain a capture rate of about 80 percent or greater without reducing the conductance for non-condensing gases to less than 50 percent, the length to diameter ratio should be within the range of about 0.5 to 1.

To maximize the diameter of the cylinder it is generally preferred that the cylinder be as near to the conduit walls as practical while avoiding any thermal short due to eccentricities, vibration and the like. A gap of about ¼ inch has been found to be suitable for an 8 inch diameter array.

Figure 4:
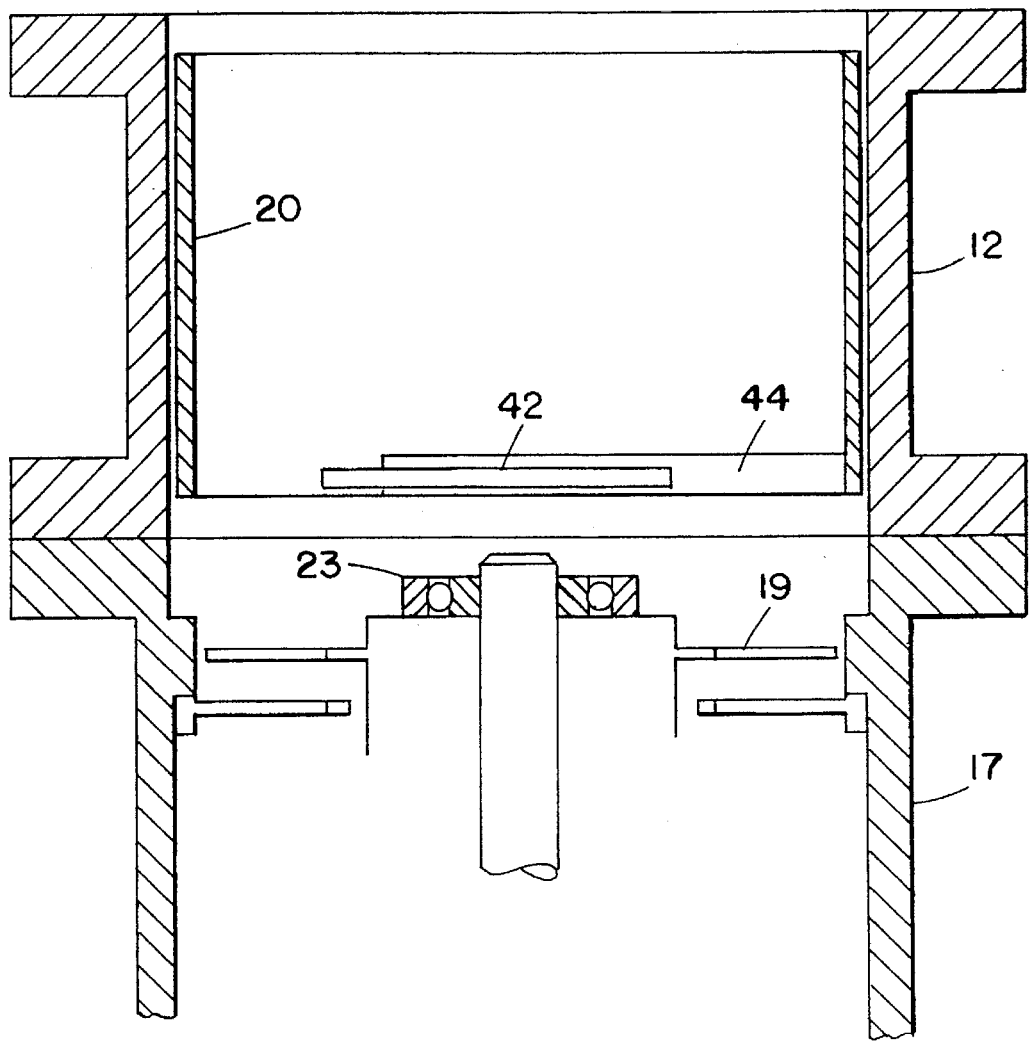
FIG. 4 is a cross-sectional view of an alternative embodiment of the invention having a center array positioned within the cylindrical array.

Any cryopumping surfaces positioned within the cylindrical array 20 would result in narrow passages of reduced width for the non-condensing gases. For example, U.S. Pat. No. 5,062,271 suggests a number of concentric cylindrical arrays. In that case, conductance is limited by the length of the arrays relative to the spacing between the arrays. To maintain high conductance for the non-condensing gases, it is important that the region within the cylindrical array 20 be left optically open. On the other hand, gases do not conduct through the center region of the turbomolecular pump at the bearing plate, but only through the peripheral annulus extending through the blades 19 outside of the blade roots. Accordingly, as illustrated in FIG. 4, a plate array 42 may be suspended over and near to the bearing plate 23 without substantially reducing the conductance through the overall array. That cryogenically cooled plate does, however, have the advantage of increasing the efficiency of the system in pumping water or allowing the cylindrical array 20 to be shortened without unduly reducing the water pumping efficiency of the system.

To minimize the reduction in conductance to the turbomolecular pump, the support for the plate 42 should be as small in cross-section and length as possible. As illustrated, the center array is cantilevered on a single strut 44, but additional support may be provided by additional radial struts.

Figure 5:
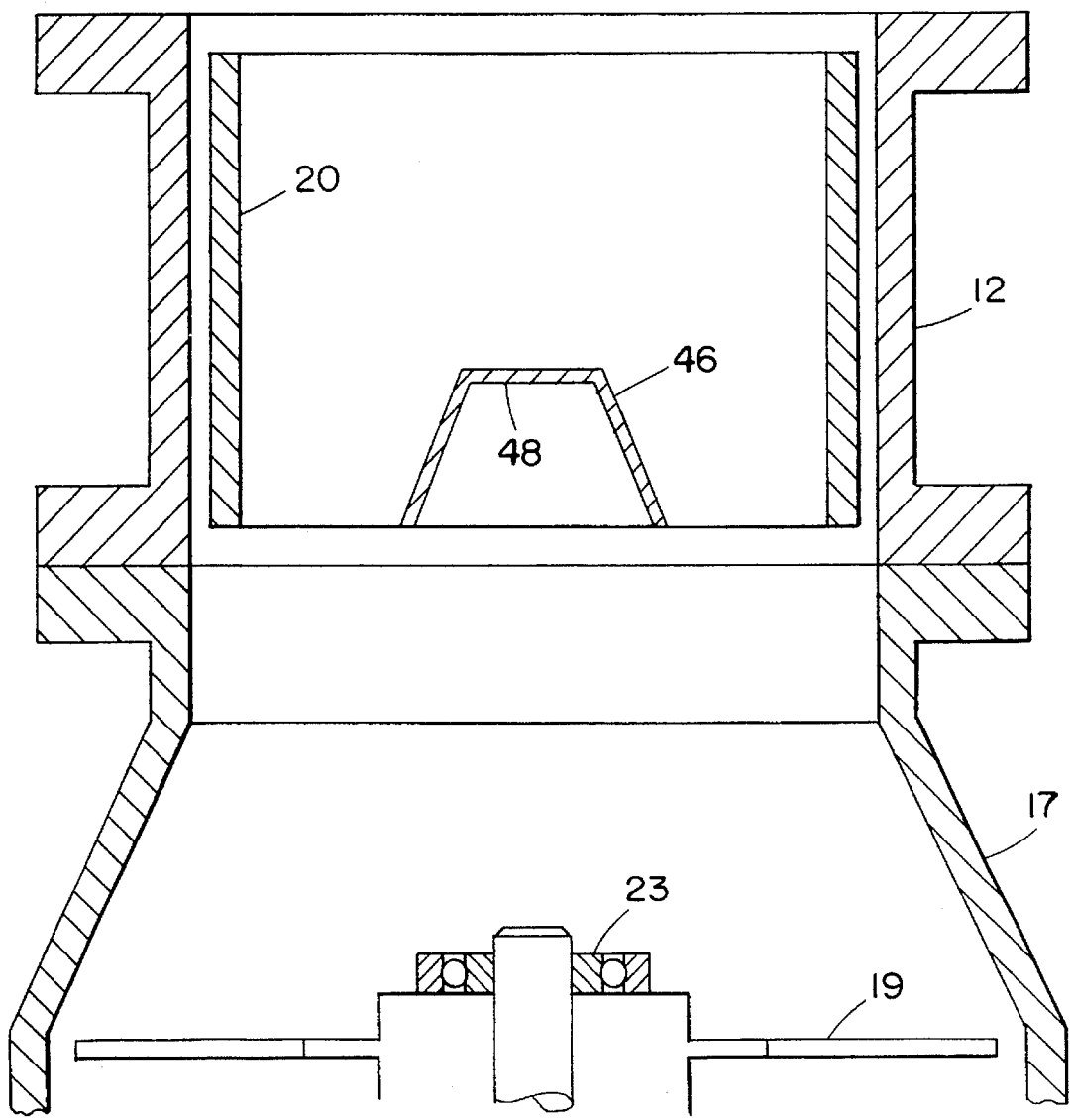
FIG. 5 is a cross-sectional view of yet another embodiment of the invention in which the center array is of a closed frustoconical shape.

A modification of the center array which further increases pumping capacity for water vapor is illustrated in FIG. 5. In this case, the center array 46 is of a conical shape. It may be either a full cone or of frustoconical shape closed by a top plate 48 as illustrated. The conical array is positioned with its base at the end of the cylindrical array 20 closest to the turbomolecular pump. The conical shape increases the surface area for trapping water vapor yet maintains an open view of the active flow region of the turbomolecular pump from across the entire inlet port of the water pump. The array remains optically open in that the blades of the turbomolecular pump can be seen from anywhere across the inlet opening of the array. Further, each point of the main conductive region through the inlet port of the turbomolecular pump can be seen from over 50% of the inlet port of the water pump.

The space between the conical array 46 and the cylindrical array 20 can be seen as a reduced-width gas passage which increases the probability that any molecule, either condensing or non-condensing, will strike one of the array surfaces. By keeping that passageway of reduced width short, and by positioning the center array 46 over the region of the turbomolecular pump which would not be conductive in any case, the center array has only a small effect on conductance through the combined water pump and turbomolecular pump.

FIG. 5 also illustrates a known turbomolecular pump having an inlet port which is reduced in diameter relative to the pump rotor. Conductance through the pump inlet port remains through the peripheral annulus.

While this invention has been particularly shown and described with references to preferred embodiments thereof, it will be understood by those skilled in the art that various changes in form and details may be made therein without departing from the spirit and scope of the invention as defined by the appended claims.

Figure 6:
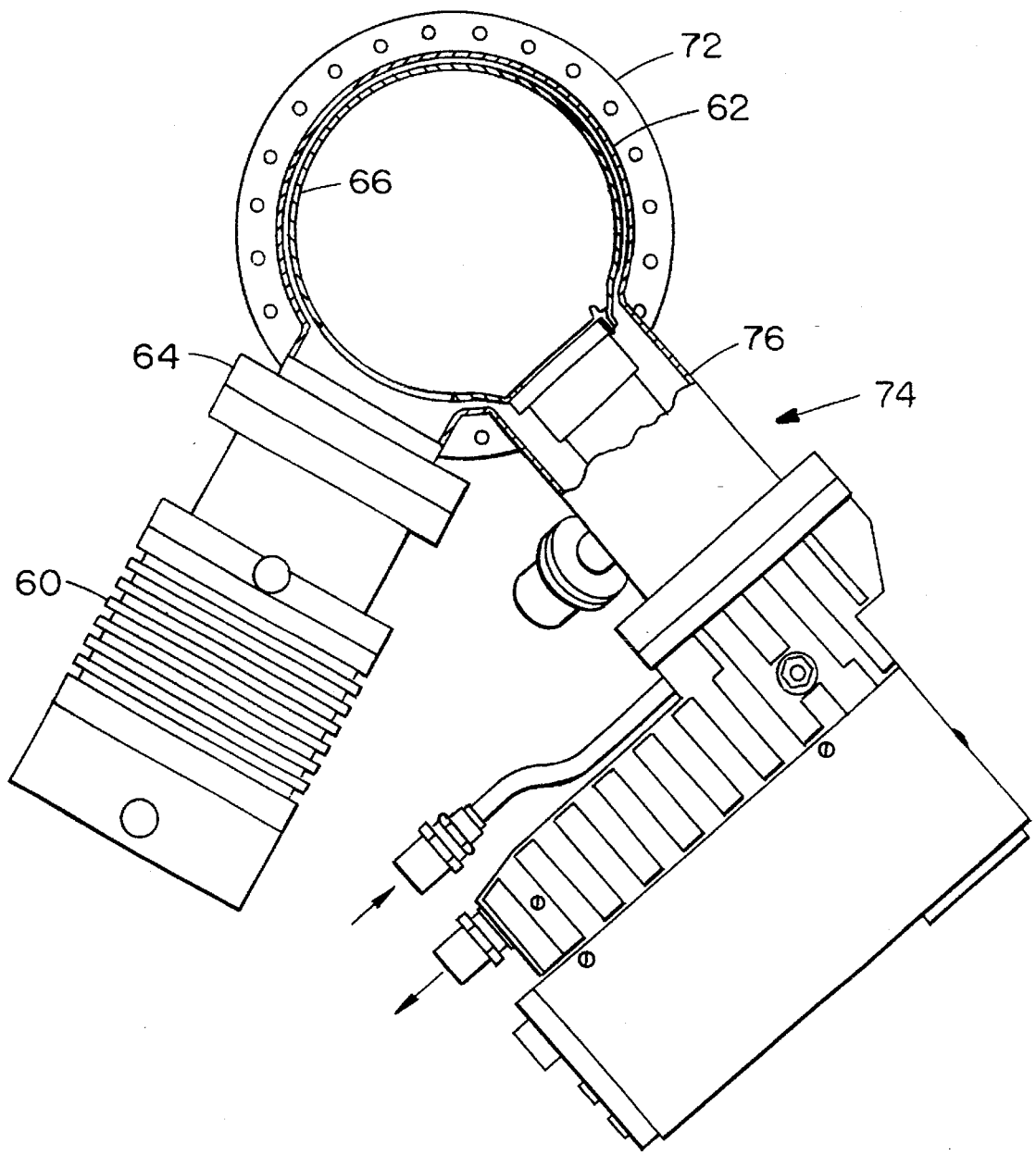
FIG. 6 is a plan view, partially broken away, of a flat configuration embodiment of the invention.
Figure 7:
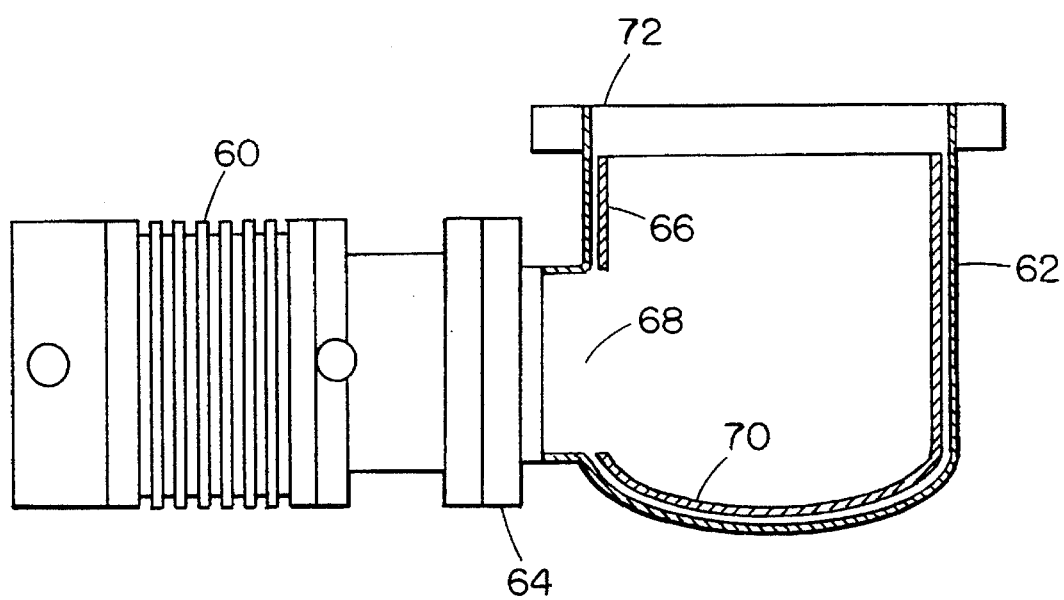
FIG. 7 is a cross-sectional view of the embodiment of FIG. 6 taken along line 7—7.

FIGS. 6 and 7 illustrate a further embodiment of the invention. Space constraints about work chambers do not always permit the in-line configuration of the previous embodiments. In this embodiment, a turbomolecular pump 60 is coupled to a fluid conduit 62 at a side flange 64. The cryopumping array 66 is still cylindrical, but an opening must be provided at 68 to allow for molecular flow to the turbomolecular pump. The end of the cylindrical array 66 may be closed at 70 to provide additional cryopumping surface. As before, the cryotrap is coupled to a work chamber by means of a flange 72 and the cryogenic refrigerator 74 is coupled to the radiation shield 66 through a side vessel 76.

As in previous embodiments, the cylindrical array of FIGS. 6 and 7 is optically open. The opening 68 to the turbomolecular pump is visible through the frontal opening at the flange 72. The length to the turbomolecular pump through the array is reduced slightly, but the hydraulic diameter remains about equal to the diameter of the cylinder. As a result, the configuration shown in FIGS. 6 and 7 has a length to hydraulic diameter ratio between 0.5 and 1. The probability of nitrogen gas conductance through the array remains greater than 0.5 with the relative dimensions shown. Any reduction in probability of capture of water vapor due to the closeness of the opening 68 to the flange 72 is offset by the additional cryopumping surface 70. Thus, a probability of water vapor capture of greater than 0.8 is maintained.

Figure 8:
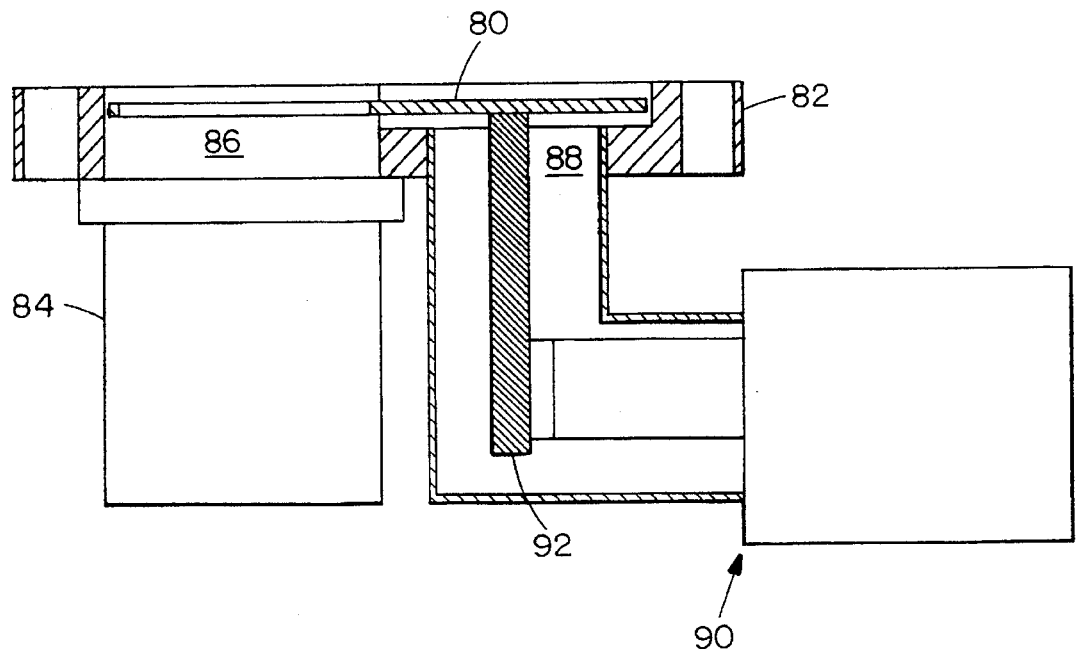
FIG. 8 is a cross-sectional view of a flat plate embodiment of the invention.
Figure 9:
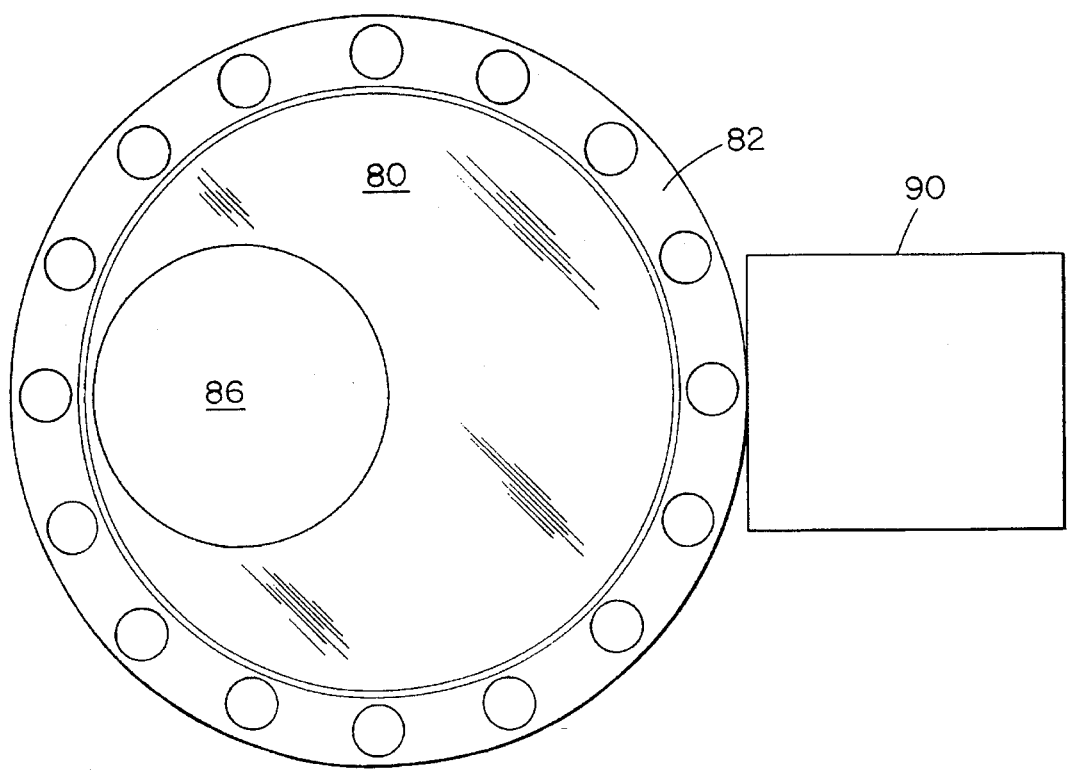
FIG. 9 is a top view of the embodiment of FIG. 8.

FIGS. 8 and 9 illustrate yet another embodiment of the invention in which there is virtually no restriction on conductance of nitrogen gas to the turbomolecular pump yet which still captures a substantial amount of water vapor. In this embodiment, the conduit to the turbomolecular pump is simply a flange 82, and the cryopumping array is a flat plate 80 which extends across the frontal opening of the flange 82. The rear side of the flange 82 has two openings. A turbomolecular pump 84 is coupled to one opening 86. A corresponding opening 86 is provided in the cryopumping plate 80 as illustrated in FIG. 9. A second rear opening 88 allows for coupling of the plate 80 to a cryogenic refrigerator 90. As illustrated in FIG. 8, the cryogenic refrigerator is oriented sideways and is coupled to the plate 80 through a thermal link 92. Alternatively, if space constraints allow, the cryogenic refrigerator 90 could be mounted in parallel with the turbomolecular pump 84 with direct coupling to the plate 80 through the opening 88.

In the embodiment of FIG. 8 the only additional length of fluid conduit presented between the turbomolecular pump and the work chamber is that of the flange 82. This configuration is the most optically open configuration of the several disclosed. The length to hydraulic diameter of the opening 86 approaches zero and thus provides for very high conductance of noncondensed gases. The plate also allows for significant capture of water vapor. However, unlike the prior embodiments, the probability of capture is not increased by increasing the length of a cylinder. Rather, it is increased by increasing the area of the plate. The cost is in the increased diameter of the flange to the work chamber which must be substantially greater than the diameter of the turbomolecular pump. The prior embodiments allow high water capture without increasing the flange diameter but do decrease the conductance of noncondensed gases for a given turbomolecular pump flange diameter.

What is claimed is:

1. A cold trap to be positioned in-line with a vacuum pump comprising:

a fluid conduit for coupling into a fluid flow path to the vacuum pump; and a cryogenically cooled cryopumping array spaced within the fluid conduit, the array having a length to hydraulic diameter ratio of about 1 or less and being optically open.

2. A cold trap as claimed in claim 1 wherein the cryopumping array comprises a generally cylindrical array.

3. A cold trap as claimed in claim 2 wherein the cylindrical array is concentric with and near to the fluid conduit.

4. A cold trap as claimed in claim 2 wherein the length to diameter ratio of the cylindrical array is greater than 0.5.

5. A cold trap as claimed in claim 2 wherein the cryopumping array further comprises a center baffle centered within the cylindrical array at a downstream end thereof.

6. A cold trap as claimed in claim 5 wherein the length to diameter ratio of the cylindrical array is within the range of about 0.5 to 1.

7. A cold trap as claimed in claim 6 wherein the center baffle is a conical baffle with its base adjacent to the downstream end of the cryopumping array.

8. A cold trap as claimed in claim 5 wherein the center baffle is a conical baffle with its base adjacent to the downstream end of the cryopumping array.

9. A cold trap as claimed in claim 1 wherein the cryopumping array captures water vapor entering the conduit in molecular flow with a probability of at least 0.8 but conducts any nitrogen gas through the conduit to the vacuum pump with a probability of at least 0.5.

10. A cold trap as claimed in claim 1 wherein the cryopumping array consists substantially entirely of a generally cylindrical array concentric with and near to the fluid conduit.

11. A cold trap as claimed in claim 1 wherein the cryopumping array has a temperature in the range of 90 K to 130 K.

12. A cold trap to be positioned in-line with a vacuum pump comprising:

a fluid conduit for coupling into a fluid flow path to the vacuum pump; and a cryogenically cooled cryopumping array which consists substantially entirely of a generally cylindrical optically open array within the fluid conduit.

13. A cold trap as claimed in claim 12 wherein the cylindrical array has a length to diameter ratio within the range of about 0.5 to 1.

14. A cold trap as claimed in claim 13 wherein the cryopumping array has a temperature in the range of 90 K to 130 K.

15. A cold trap to be positioned in-line with a vacuum pump comprising:
   a fluid conduit for coupling into a fluid flow path to the vacuum pump; and
   a cryogenically cooled cryopumping array comprising an optically open, generally cylindrical array concentric with the fluid conduit, the length to diameter ratio of the cylindrical array being within the range of about 0.5 to 1.

16. A cold trap as claimed in claim 15 wherein the cryopumping array further comprises a center baffle centered within the cylindrical array at a downstream end thereof.

17. A cold trap as claimed in claim 16 wherein the center baffle is a conical baffle with its base adjacent to the downstream end of the cryopumping array.

18. A cold trap as claimed in claim 15 wherein the cryopumping array has a temperature in the range of 90 K to 130 K.

19. A cold trap as claimed in claim 15 wherein all passages through the cryopumping array have a length to width ratio of about 1 or less.

20. A cold trap to be positioned in-line with a vacuum pump comprising:
   a fluid conduit for coupling into a fluid flow path to the vacuum pump; and
   a cryogenically cooled cryopumping array spaced within the fluid conduit which captures water vapor entering the conduit in molecular flow with a probability of at least 0.8 but conducts any nitrogen gas through the conduit to the vacuum pump with a probability of at least 0.5, the cryopumping array being optically open.

21. A cold trap to be positioned in-line with a vacuum pump comprising:
   a fluid conduit for coupling into a fluid flow path to the vacuum pump;
   a cryogenically cooled cryopumping array spaced within the fluid conduit, the cryopumping array including a generally cylindrical array concentric with and near to the fluid conduit and having a length to diameter ratio within the range of about 0.5 to 1, the cryopumping array capturing water vapor in molecular flow entering the conduit with a probability of least 0.8 but conducting any nitrogen gas through the conduit to the vacuum pump with a probability of at least 0.5, the cryopumping array being optically open; and
   a cryogenic refrigerator which cools the cryopumping array to a temperature within the range of about 90 K to about 130 K.

22. A method of trapping water in a fluid flow path comprising:
   suspending an optically open cryopumping array in a fluid flow path ahead of a vacuum pump, the length to hydraulic diameter ratio of the cryopumping array being about 1 or less;
   cooling the cryopumping array to cryogenic temperature to capture water vapor from the fluid flow path; and
   drawing gas through the cryopumping array with the vacuum pump.

23. A method as claimed in claim 22 wherein the cryopumping array comprises a generally cylindrical array concentric with and near to the fluid conduit.

24. A method as claimed in claim 23 wherein the cylindrical array has a length to diameter ratio within the range of about 0.5 to 1.

25. A method as claimed in claim 24 wherein the cryopumping array further comprises a center baffle centered within the cylindrical array at a downstream end thereof.

26. A method as claimed in claim 22 wherein the cryopumping array consists substantially entirely of a generally cylindrical array concentric with and near to the fluid conduit.

27. A method as claimed in claim 22 wherein the cryopumping array captures water vapor entering the conduit in molecular flow with a probability of at least 0.8 but conducts any nitrogen gas through the conduit to the vacuum pump with a probability of at least 0.5.

28. A method as claimed in claim 22 wherein gas is drawn by a turbomolecular pump.

29. A method of trapping water in a fluid flow path comprising:
   suspending an optically open cryopumping array in a fluid flow path ahead of a vacuum pump;
   cooling the cryopumping array to cryogenic temperature to capture water vapor from the fluid flow path; and
   drawing gas through the cryopumping array with the vacuum pump;
   the cooled cryopumping array capturing water vapor entering the cryopumping array with a probability of at least about 0.8 but being of an open configuration and temperature such that any nitrogen gas conducts past the cryopumping array with a probability of at least 0.5.

30. A method as claimed in claim 29 wherein gas is drawn by a turbomolecular pump.

31. A vacuum system for drawing a vacuum on a work chamber comprising:
   a turbomolecular pump; and
   an optically open cryogenically cooled cryopumping array positioned between the chamber and the turbomolecular pump and through which gas flows to the turbomolecular pump, the array condensing water vapor flowing toward the turbomolecular pump.

32. A vacuum system as claimed in claim 31 wherein the cryopumping array has a length to hydraulic diameter ratio of about 1 or less.

33. A vacuum system as claimed in claim 32 wherein the length to hydraulic diameter ratio is greater than 0.5.

34. A vacuum system as claimed in claim 31 wherein the cryopumping array is cylindrical.

35. A vacuum system as claimed in claim 34 wherein the cryopumping array has a length to hydraulic diameter ratio of about 1 or less.

36. A vacuum system as claimed in claim 35 wherein the length to hydraulic diameter ratio is greater than 0.5.

37. A vacuum system as claimed in claim 31 wherein the cryopumping array captures water vapor entering the conduit in molecular flow with a probability of at least 0.8 but conducts any nitrogen gas through the conduit to the vacuum pump with a probability of at least 0.5.

38. A vacuum system for drawing a vacuum on a chamber comprising:

a turbomolecular pump;

a fluid conduit for conducting gas from the chamber to the turbomolecular pump; and a cryogenically cooled plate positioned between the chamber and the turbomolecular pump, the plate having an opening therein for conducting gases to the turbomolecular pump and being cryogenically cooled to condense water vapor.

39. A vacuum system as claimed in claim 38 wherein the fluid conduit is a flange coupled to the work chamber, the flange having separate rear openings, one opening coupled to the turbomolecular pump and one opening providing access to the plate from a cryogenic refrigerator.

40. A cold trap to be positioned in line with a vacuum pump comprising:

a flange to be coupled to a work chamber, the flange having separate rear openings, one opening providing a fluid flow path to a vacuum and a second opening providing access from a cryogenic refrigerator;

a flat plate mounted perpendicular to the fluid flow path to the vacuum pump, the plate having an opening in line with the fluid flow path to the vacuum pump; and a cryogenic refrigerator for cooling the plate through the second opening.

* * * * *